United States Patent
Morimoto et al.

(10) Patent No.: US 7,388,199 B2
(45) Date of Patent: Jun. 17, 2008

(54) PROBE MANUFACTURING METHOD, PROBE, AND SCANNING PROBE MICROSCOPE

(75) Inventors: Takafumi Morimoto, Tsuchiura (JP); Tooru Shinaki, Tsuchiura (JP); Yoshiyuki Nag'No, Tsuchiura (JP); Yukio Kenbou, Tsuchiura (JP); Yuuichi Kunitomo, Tsuchiura (JP); Takenori Hiroki, Tsuchiura (JP); Tooru Kurenuma, Tsuchiura (JP); Hiroaki Yanagimoto, Tsuchiura (JP); Hiroshi Kuroda, Tsuchiura (JP); Shigeru Miwa, Tsuchiura (JP); Ken Murayama, Tsuchiura (JP); Mitsuo Hayashibara, Tsuchiura (JP); Kishio Hidaka, Tsuchiura (JP); Tadashi Fujieda, Tsuchiura (JP)

(73) Assignee: Hitachi Kenki Fine Tech Co., Ltd., Tokyo (JP)

( * ) Notice: Subject to any disclaimer, the term of this patent is extended or adjusted under 35 U.S.C. 154(b) by 0 days.

(21) Appl. No.: 10/570,198

(22) PCT Filed: Sep. 3, 2004

(86) PCT No.: PCT/JP2004/012821

§ 371 (c)(1),
(2), (4) Date: Mar. 2, 2006

(87) PCT Pub. No.: WO2005/024390

PCT Pub. Date: Mar. 17, 2005

(65) Prior Publication Data
US 2006/0284084 A1    Dec. 21, 2006

(30) Foreign Application Priority Data
Sep. 3, 2003    (JP) .............................. 2003-311579

(51) Int. Cl.
*G21K 7/00* (2006.01)
(52) U.S. Cl. ..................... 250/306; 250/307; 250/492.3
(58) Field of Classification Search ............. 250/492.3, 250/306–311; 313/310; 73/1.89, 105; 977/860, 977/875, 876
See application file for complete search history.

(56) References Cited

U.S. PATENT DOCUMENTS

| 5,445,710 | A  | * | 8/1995  | Hori et al. .................. 438/717 |
| 6,705,154 | B2 | * | 3/2004  | Nakayama et al. ............ 73/105 |
| 6,759,653 | B2 | * | 7/2004  | Nakayama et al. .......... 250/306 |
| 6,800,865 | B2 | * | 10/2004 | Nakayama et al. ....... 250/492.3 |

(Continued)

FOREIGN PATENT DOCUMENTS

JP    11-086364    3/1999

(Continued)

Primary Examiner—Jack I. Berman
Assistant Examiner—Michael J Logie
(74) Attorney, Agent, or Firm—Mattingly, Stanger, Malur & Brundidge, PC (57) ABSTRACT

A probe is made by attaching a carbon nanotube 12 to a mounting base end 13, which eliminates the effects of a carbon contamination film, to increase the bonding strength, increase the conductivity of the probe, and strengthen the bonding performance thereof by coating the entire circumference of the nanotube and the base with a coating film, rather than coating just one side. The work of mounting the carbon nanotube and mounting base end are performed under observation by a microscope. Further, the carbon contamination film 14 formed by an electron microscope is stripped off at a stage before bonding by the coating film.

17 Claims, 4 Drawing Sheets

U.S. PATENT DOCUMENTS

| | | |
|---|---|---|
| 6,991,932 B2 * | 1/2006 | Hidaka et al. ............ 435/287.2 |
| 7,041,611 B2 * | 5/2006 | Blick et al. .................... 438/10 |
| 2003/0001091 A1 * | 1/2003 | Nakayama et al. .......... 250/306 |
| 2003/0029996 A1 * | 2/2003 | Nakayama et al. .......... 250/306 |
| 2003/0122073 A1 * | 7/2003 | Nakayama et al. .......... 250/306 |
| 2003/0173338 A1 * | 9/2003 | Vallance et al. .......... 219/121.2 |
| 2004/0173378 A1 * | 9/2004 | Zhou et al. .................. 174/260 |
| 2004/0173744 A1 * | 9/2004 | Takazawa et al. ........... 250/307 |
| 2005/0242283 A1 * | 11/2005 | Hasegawa et al. ........... 250/310 |

FOREIGN PATENT DOCUMENTS

| | | |
|---|---|---|
| JP | 2000-227435 | 8/2000 |
| JP | 2002-025497 | 1/2002 |
| JP | 2002-162337 | 7/2002 |
| JP | 2002-240700 | 8/2002 |

* cited by examiner

PROBE MANUFACTURING METHOD, PROBE, AND SCANNING PROBE MICROSCOPE

TECHNICAL FIELD

The present invention relates to a method of producing a probe suitable for stably mounting a nanotube at a base member with a sufficient bonding strength in a scanning probe microscope provided with a probe utilizing a carbon nanotube as a probe tip, such a probe, and such a scanning probe microscope.

BACKGROUND ART

In recent years, scanning probe microscopes and electron microscopes using carbon nanotubes and other nanotubes as tips of probes have been proposed (Patent Document 1). Nanotubes are utilized in scanning probe microscopes as probe tips provided at the front ends of cantilevers and are utilized in electron microscopes as electron source probes. Patent Document 1 generally discloses a surface signal scan probe for electronic apparatuses and a method of producing the same. Electronic apparatuses include scanning probe microscopes. The probe disclosed in Patent Document 1 is produced utilizing carbon nanotubes and other various types of nanotubes. This is so as to try to realize a high resolution, high rigidity, and high bending modulus probe. In probe tips of scanning probe microscopes, research and studies have been conducted to increase the resolution from the viewpoint of how to make them sharper. In this sense, nanotubes may become important technology for the future.

Patent Document 1 (Japanese Patent Publication (A) No. 2000-227435) discloses an example of a method of producing a probe utilizing a carbon nanotube. A carbon nanotube is easy to produce, is inexpensive, and is suitable for mass production. The Patent Document 1 explains as an optimal method of production the method of production using electrophoresis to arrange a carbon nanotube at a metal plate of a holder etc. The carbon nanotube arranged at the holder is mounted at a mounting base end in the state attached to the holder. The mounting base end is for example the probe tip of an atomic force microscope. This mounting work (assembly work) is performed while positioning under observation by a scanning electron microscope (SEM). After the mounting work, the region including the mounting base end is formed with a coating film so as to bond the carbon nanotube to the mounting base end. As the method for forming the coating film, the method of using electron beam irradiation based on an SEM to form a carbon film, the method of breaking down reactive coating gas by an electron beam to form a coating film, and also the examples of CVD or PVD have been proposed. The carbon film formed by electron beam irradiation based on an SEM is usually called a "carbon contamination film". Further, technology for forming a coating film at an intermediate part between the carbon nanotube and mounting base end to form a coating film and increase the carbon nanotube in thickness and strength has already been proposed.

According to the method of producing a probe utilizing a nanotube described in the above Patent Document 1, the problem arises that the produced probe is insufficient in strength. That is, when bonding the carbon nanotube to the mounting base end, the bonding coating film is formed via the carbon contamination film arising due to SEM observation, so the bonding strength becomes insufficient. Further, when strengthening a probe made using a carbon nanotube, since only one side is coated, sufficient strengthening is not possible. Further, since the bonding is via a carbon contamination film, the problem also arises that the conductivity is difficult to secure.

[Patent Document 1] Japanese Patent Publication (A) No. 2000-227435

DISCLOSURE OF THE INVENTION

Problem to be Solved by the Invention

The subject of the present invention is to increase the bonding strength by a bonding means, increase the conductivity performance of a probe, and improve the bonding performance of the bonding means when producing a probe by mounting a carbon nanotube etc. to a mounting base end and bonding them by a bonding coating film or other bonding means.

An object of the present invention, in view of the above subject, is to provide a method of producing a probe by mounting a carbon nanotube etc. to a mounting base end and using a carbon film for bonding which method of producing a probe can eliminate the effects of the carbon contamination film etc., improve the bonding strength, improve the conductivity of the probe, and further strengthen the bonding performance by coating the entire circumference rather than one-sided coating.

Another object of the present invention is to provide a probe having a high bonding strength and high conductivity and a scanning probe microscope provided with such a probe.

MEANS FOR SOLVING THE PROBLEM

The method of producing a probe, probe, and scanning probe microscope according to the present invention is configured as follows to achieve the above objects.

The method of producing a probe according to the present invention is a method of producing a probe comprised of a carbon nanotube or other nanotube, a base (mounting base end) holding this nanotube, and a bonding part (coating film etc.) bonding the nanotube to the base, which method comprises performing the work of attaching the nanotube and base under observation by an observation device and, at a stage before bonding by the bonding part, stripping a contamination film formed by the observation device.

In the above method of producing a probe, the contamination film is removed at a stage before bonding using the bonding part of the contamination film. Due to this, the surface of the nanotube is exposed. Therefore, when bonding the nanotube and base after this, the coating film etc. is directly bonded to the nanotube, the problem of the insufficient strength due to the contamination film is eliminated, and the bonding strength can be improved. Further, by suitably eliminating the contamination film, the probe can also be enhanced in conductivity.

The method of producing a probe according to the present invention provides the above method of production wherein preferably the observation device is an electron microscope and the contamination film is a carbon film.

The method of producing a probe according to the present invention provides the above method of production wherein preferably the carbon film is removed by focused ion beam processing.

The method of producing a probe according to the present invention provides the above method of production wherein preferably the carbon film is removed by heating.

The method of producing a probe according to the present invention is a method of producing a probe comprised of a nanotube, a base holding this nanotube, and a bonding part bonding the nanotube to the base, characterized in that the bonding by the bonding part is performed after reattaching the nanotube from the holder to which it had been attached to the base.

The method of producing a probe according to the present invention provides the above method of production wherein preferably the bonding by the bonding part is performed while rotating the nanotube and base about their axes.

The method of producing a probe according to the present invention provides the above method of production wherein preferably a bonding region formed by the bonding part is formed near the end of the base.

The method of producing a probe according to the present invention is for producing a probe comprised of a nanotube, a base holding this nanotube, and a bonding part bonding the nanotube to the base, characterized in that the bonding by the bonding part is performed while rotating the nanotube and base about their axes. Since the bonding part is formed at the entire circumference of the part where the nanotube and the base are bonded, the strength of the bond becomes higher than the case of just a single side.

The method of producing a probe according to the present invention provides the above method of production wherein preferably the bonding by the bonding part is performed after reattaching the nanotube from the holder to which it is attached to the base.

The method of producing a probe according to the present invention provides the above method of production wherein preferably the bonding part is a carbon film formed by electron beam irradiation.

The method of producing a probe according to the present invention provides the above method of production wherein preferably the bonding part is a film of a substance formed by introducing a reactive gas and electron beam irradiation.

The method of producing a probe according to the present invention provides the above method of production wherein preferably the bonding part is a film of a substance formed by focused ion beam irradiation.

The scanning probe microscope according to the present invention is provided with a probe tip part provided so that a probe tip faces a sample and a measurement part for measuring a physical quantity occurring between the probe tip and sample when the probe tip scans the surface of the sample, wherein this measurement part holds the physical quantity constant while the probe tip scans the surface of the sample so as to measure the surface of the sample, the probe tip is comprised of a nanotube, a base holding this nanotube, and a bonding means for bonding the nanotube to the base, and a contamination film formed by an observing means is stripped off at a stage before bonding by the bonding means.

The scanning probe microscope according to the present invention is provided with a probe tip part provided so that a probe tip faces a sample and a measurement part for measuring a physical quantity occurring between the probe tip and sample when the probe tip scans the surface of the sample, wherein this measurement part holds the physical quantity constant while the probe tip scans the surface of the sample so as to measure the surface of the sample, the probe tip is comprised of a nanotube, a base holding this nanotube, and a bonding means for bonding the nanotube to the base, and the bonding means is a coating film provided over the entire circumferences of the nanotube and base.

In the scanning probe microscope, the probe tip part is a cantilever having the probe tip at its front end.

The probe according to the present invention is used for a scanning probe microscope or electron microscope, is provided with a probe tip comprised of a nanotube, a base holding this nanotube, and a bonding means bonding the nanotube to the base, and is stripped of a contamination film formed by an observing means at a stage before bonding by the bonding means.

Alternatively, the probe according to the present invention is used for a scanning probe microscope or electron microscope and is provided with a probe tip comprised of a nanotube, a base holding this nanotube, and a bonding means bonding the nanotube to the base, the bonding means being a coating film provided over the entire circumferences of the nanotube and base.

EFFECT OF THE INVENTION

According to the method of producing a probe of the present invention, there is provided a method of producing a probe by attaching a nanotube to a mounting base end under observation by an SEM etc. and bonding the them by a coating film etc. wherein a carbon contamination film formed due to the SEM etc. is stripped off at a stage before the bonding work to enable bonding without the effects of the carbon contamination film etc., so the nanotube and mounting base end may be directly bonded, the strength may be improved, and the conductivity may be improved. According to the present invention, when detaching the holder from the nanotube after the mounting work, the contamination film is broken and the surface of the nanotube is exposed.

According to the probe of the present invention, it is possible to increase the bonding strength and increase the conductivity. Further, by using this probe as an AFM probe, it is possible to utilize this as AFM lithography based on its high conductivity.

According to the scanning probe microscope of the present invention, by providing a probe having a high bonding strength and conductivity, it is possible to raise the durability of the device and possible to release the charge due to the high conductivity so eliminate the effects of static electricity and thereby improve the measurement accuracy.

BEST MODE FOR WORKING THE INVENTION

Below, preferred embodiments of the present invention will be explained based on the attached drawings.

Figure 1:
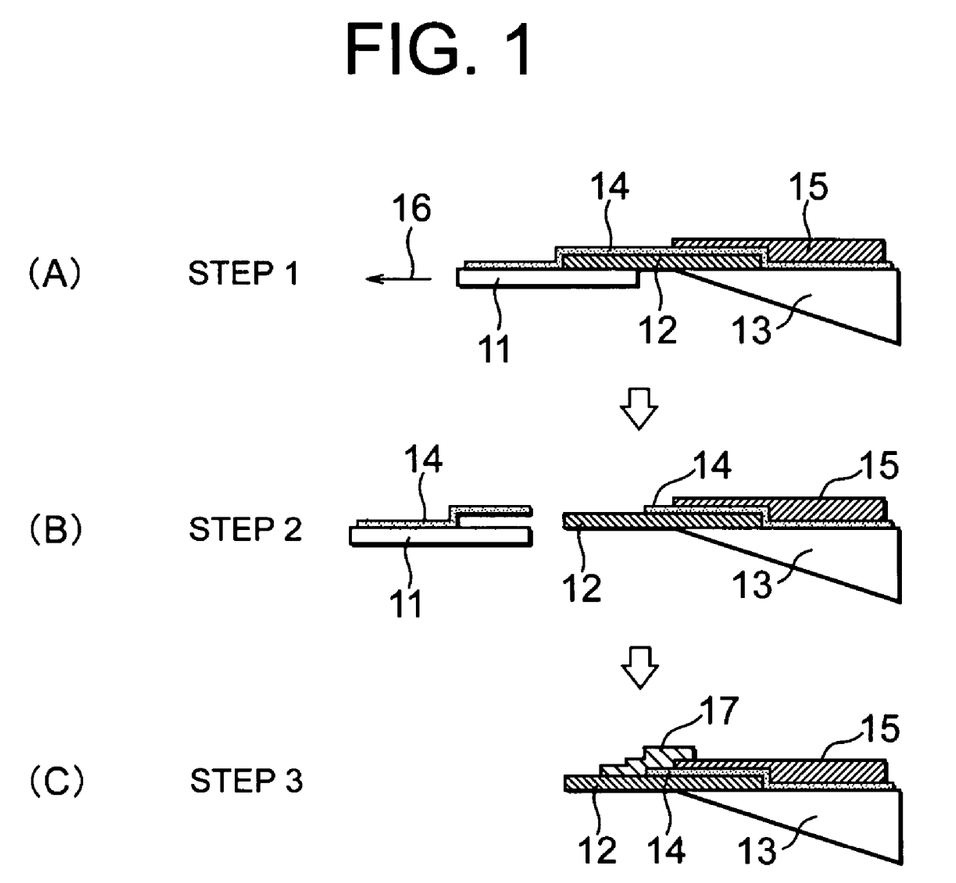
[FIG. 1] Step diagrams showing a method of production according to a first embodiment of the present invention.

Referring to FIG. 1, the method of producing a probe according to a first embodiment of the present invention will be explained. In FIG. 1, 11 indicates a holder (metal sheet), 12 a carbon nanotube, and 13 a mounting base end. The carbon nanotube 12 is produced by for example the electrophoresis method and is obtained in the state attached to the holder 11. The carbon nanotube 12 is a cylindrical member with a cross-sectional diameter of 1 nm to several tens of nm. The mounting base end 13 is for example a probe tip formed at a cantilever used for an atomic force microscope. This probe tip, that is, the mounting base end 13, is usually produced utilizing semiconductor film forming technology etc. The carbon nanotube 12 is attached and bonded to the front end of the mounting base end 13, whereby a probe is assembled and produced.

In FIG. 1, three partial views (A), (B), and (C) are used to show steps 1 to 3 of the method of production. At step 1, the holder 11 is used to attach a carbon nanotube 12 to the front end of the mounting base end 13. A carbon film is formed (carbon contamination film 14) and a bonding coating film 15 is used to bond the carbon nanotube 12 and the mounting base end 13. At step 1, as shown by the arrow 16, force is applied to separate the holder 11 from the carbon nanotube 12. The results are shown in step 2.

At step 2 of (B) in FIG. 1, the holder 11 is separated from the carbon nanotube 12. At this time, the carbon contamination film 14 is also partially shredded and separated together with the holder 11. As a result, at the right part of the carbon nanotube 12 shown in (B) of FIG. 1, a part arises where there is no carbon contamination film and therefore a part of the carbon nanotube 12 forming the surface is exposed.

At step 3 of (C) of FIG. 1, the carbon contamination film 14 is peeled off and the exposed part of the surface of the carbon nanotube 12 is utilized to again form a bonding coating film 17. The new bonding coating film 17 is formed to cover the exposed part of the carbon nanotube 12, the remaining carbon contamination film 14, and the first bonding coating film 15. In this way, the carbon nanotube 12 is bonded to the mounting base end 13 by the new bonding coating film 17 after the attachment work and after detachment of the holder 11.

According to the first embodiment, the bonding coating film 17 is used to bond the carbon nanotube 12 and the mounting base end 13. The bonding is performed in the state after removing the carbon contamination film 14 to eliminate its effects. Further, the new bonding coating film 17 is used to bond the carbon nanotube 12 and the mounting base end 13 near the front end or at a projecting part of the mounting base end 13. Due to the above, direct bonding becomes possible and an improvement of the bonding strength and improvement conductivity can be achieved.

Figure 2:
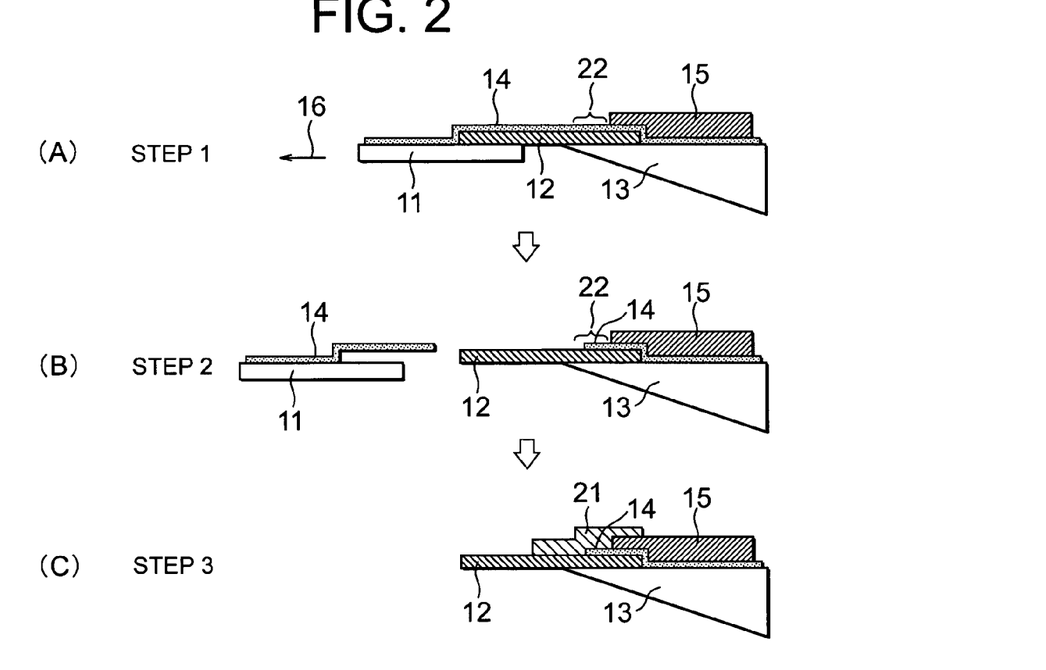
[FIG. 2] Step diagrams showing a method of production according to a second embodiment of the present invention.

Referring to FIG. 2, a method of producing a probe according to a second embodiment of the present invention will be explained. In FIG. 2, elements the same as elements explained in FIG. 1 are assigned the same reference notations and explanations are omitted. Steps 1 to 3 of (A) to (C) are basically the same as the case of the first embodiment. In FIG. 2, 11 indicates a holder, 12 a carbon nanotube, 13 a mounting base end, 14 a carbon contamination film, 15 a first bonding coating film, and 21 a new bonding coating film added after bonding.

In the method of producing a probe according to the second embodiment, due to the relationship of the carbon contamination film 14 and bonding coating film 15, a wide region 22 with no coating film is secured. Therefore, when bonding again by the bonding coating film 21 at step 3, the area of the surface of the bonding coating film 21 is increased and the bonding portion is formed including a part in addition to near the end of the mounting base end 13.

According to the method of producing a probe of the second embodiment, it is possible to increase the region of the exposed part of the carbon nanotube 12, possible to increase the region directly contacting the bonding coating film 21, and possible to improve the bonding strength.

Figure 3:
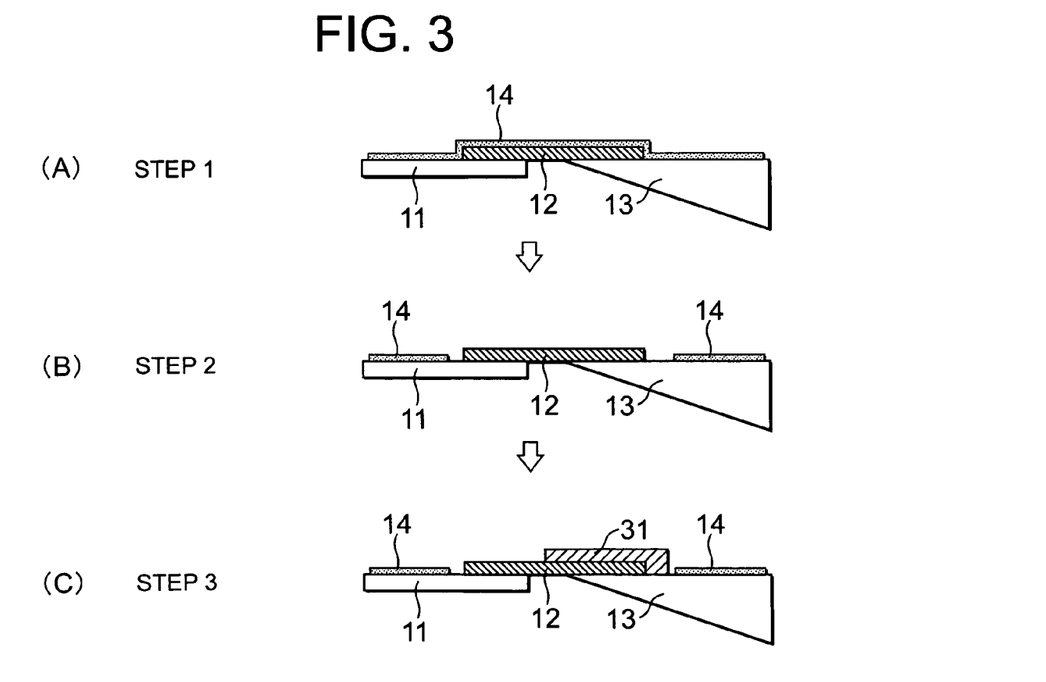
[FIG. 3] Step diagrams showing a method of production according to a third embodiment of the present invention.

Referring to FIG. 3, a method of producing a probe according to a third embodiment of the present invention will be explained. In FIG. 3, elements the same as elements explained in FIG. 1 or FIG. 2 are assigned the same reference notations and explanations are omitted. (A) to (C) of FIG. 3 show steps 1 to 3 of the method of producing a probe according to the third embodiment. In FIG. 3, 11 indicates a holder, 12 a carbon nanotube, 13 a mounting base end, 14 a carbon contamination film, and 31 a bonding coating film.

In the method of producing a probe according to the third embodiment, at step 1, the holder 11 provided with the carbon nanotube 12 is attached to the mounting base end 13. At this time, the holder 11 and carbon nanotube 12 and the mounting base end 13 are bonded by the carbon contamination film 14. In this state, at step 2, before the coating work, part of the carbon contamination film 14 is removed. The carbon contamination film 14 is removed using for example a method using a focused ion beam (FIB) or a method using heating. After this, as shown at step 3, the bonding coating film 31 is formed between the carbon nanotube 12 and the mounting base end 13. After this, at a suitable timing, the holder 11 is removed.

According to the third embodiment, before the coating work for forming the bonding coating film 31, it is possible to remove part of the carbon contamination film 14 and bring the bonding coating film 31 into direct contact with the carbon nanotube 12, reliably eliminate the effect of the carbon contamination film 14, and enlarge the direct contact area to increase the strength of the bond.

Figure 4:
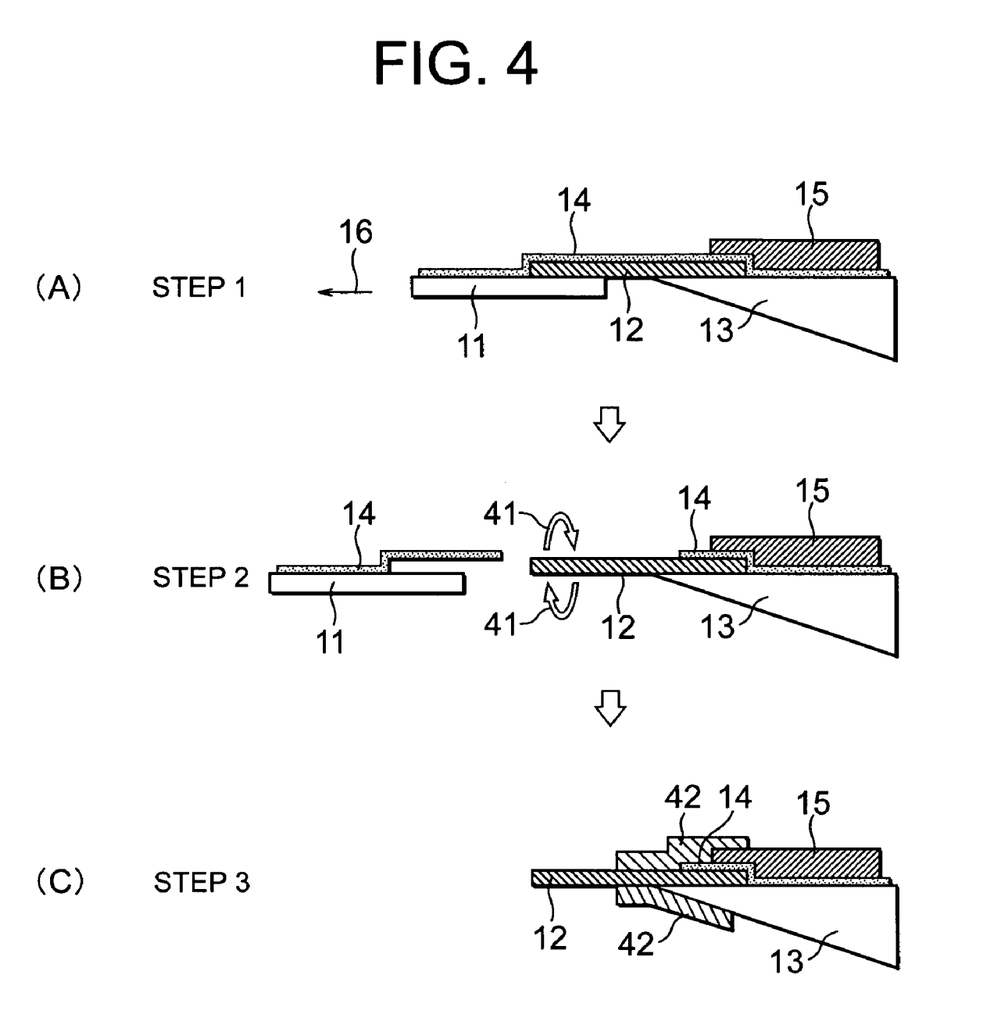
[FIG. 4] Step diagrams showing a method of production according to a fourth embodiment of the present invention.

Referring to FIG. 4, a method of producing a probe according to a fourth embodiment of the present invention will be explained. In FIG. 4, elements the same as elements explained in FIG. 1, FIG. 2, etc. are assigned the same reference notations and explanations are omitted. (A) to (C) of FIG. 4 show steps 1 to 3 of the method of producing a probe according to the fourth embodiment. This fourth embodiment is a modification of the second embodiment. In FIG. 4, 11 indicates a holder, 12 a carbon nanotube, 13 a mounting base end, 14 a carbon contamination film, and 15 a bonding coating film. The state shown by step 1 of (A) in FIG. 4 is the same as the state shown by step 1 of (A) in FIG. 2.

In the fourth embodiment, at the stage of transition from step 1 to step 2, the holder 11 is separated from the carbon nanotube 12, then, as shown by the arrow 41, the carbon nanotube 12 is arranged so as to match with the axis of rotation and the mounting base end 13 is rotated while performing coating work for imparting a bonding coating film. For this reason, as shown by (C) in FIG. 4, the entire circumference of the carbon nanotube 12 can be given the bonding coating film 42. More particularly, the bonding part between the carbon nanotube 12 and the mounting base end 13 and the surrounding part including that bonding part are given the bonding coating film 42 over the entire circumference in the circumferential direction. The rotation drive mechanism used may be one of any configuration.

In the above, the coating film 42 is a carbon film formed by electron beam irradiation, a film of a desired substance formed by introducing a reactive gas and by electron beam irradiation, or a film of a desired substance deposited by FIB irradiation.

According to the fourth embodiment, since a new bonding coating film can be provided over the entire circumference, the contact region between the carbon nanotube and the bonding coating film can be increased, the bonding strength can be improved, and the conductivity can be improved.

In the above embodiments, as the bonding coating film, a carbon film formed by electron beam irradiation, a film of a desired substance formed by introducing a reactive gas and by electron beam irradiation, a film of a desired substance deposited by focused ion beam irradiation, etc. is used.

Next, an example of a scanning probe microscope provided with a probe produced by the above-mentioned method of production will be explained with reference to FIG. 5. This scanning probe microscope envisions as a typical example an atomic force microscope (AFM).

The bottom part of the scanning probe microscope is provided with a sample stage 111. The sample stage 111 carries a sample 112 on it. The sample stage 111 is a mechanism for changing the position of the sample 112 by a three-dimensional coordinate system 113 comprised of a perpendicular X-axis, Y-axis, and Z-axis. The sample stage 111 is comprised of an XY-stage 114, Z-stage 115, and sample holder 116. The sample stage 111 is usually comprised of a rough (or coarse) movement mechanism causing displacement (change of position) at the sample side. The sample stage 111 has a sample holder 116 on the top surface of which a relatively large area, sheet shaped sample 112 is placed and held. The sample 112, for example, is a substrate or wafer on the surface of which an integrated circuit pattern of a semiconductor device is fabricated. The sample 112 is fixed on the sample holder 116. The sample holder 116 is provided with a sample-fixing chuck mechanism.

Figure 5:
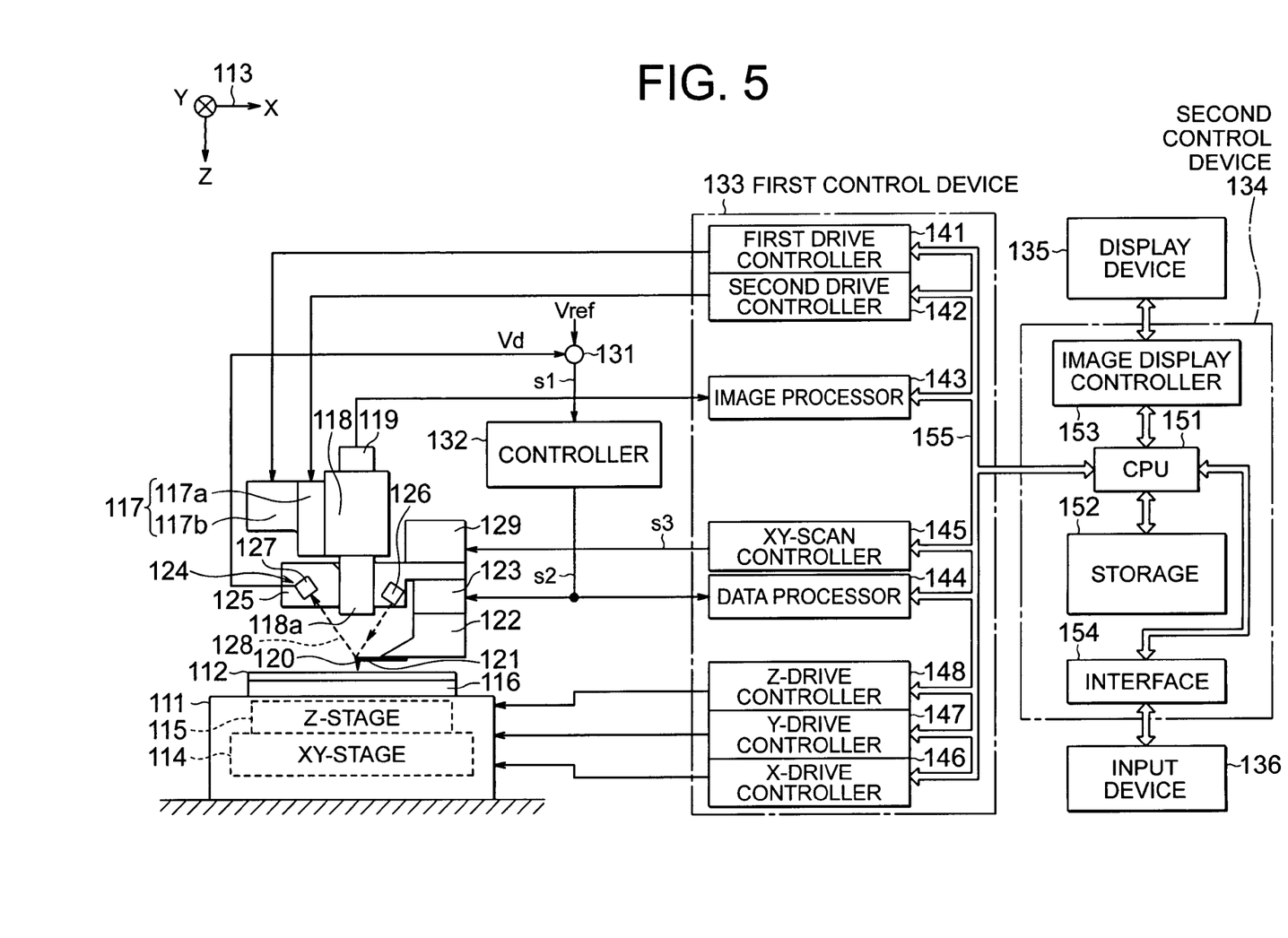
[FIG. 5] A view of the configuration of a scanning probe microscope according to the present invention.

In FIG. 5, at a position above the sample 112, an optical microscope 118 provided with a drive mechanism 117 is arranged. The optical microscope 118 is supported by the drive mechanism 117. The drive mechanism 117 is comprised of a focus use Z-direction movement mechanism 117a for moving the optical microscope 118 in the Z-axis direction and an XY-direction movement mechanism 117b for moving it in the X-and Y-axis directions. Due to the way they are attached, the Z-direction movement mechanism 117a moves the optical microscope 118 in the Z-axis direction, while the XY-direction movement mechanism 117b moves the unit of the optical microscope 118 and the Z-direction movement mechanism 117a in the X-and Y-axis directions. The XY-direction movement mechanism 117b is fixed to a frame member, but in FIG. 5, illustration of the frame member is omitted. The optical microscope 118 is arranged so that its object lens 118a faces downward and is arranged at a position approaching the surface of the sample 112 from directly above it. The optical microscope 118 is provided at its top end with a camera 119. The camera 119 captures an image of a specific area of the sample surface covered by the object lens 118a and outputs the image data.

Above the sample 112, a cantilever 121 provided with a probe tip 120 at its front end is arranged in a close state. The cantilever 121 is fixed to a mount 122. The mount 122, for example, is provided with an air suction part (not shown). This air suction part is connected to an air suction device (not shown). The cantilever 121 is affixed and mounted so that this large area base is held by suction on the suction part of the mount 122.

As the probe tip 120, the above-mentioned probe is used. The probe tip 120 is formed with a mounting base end 13 and a carbon nanotube 12. The front end of the probe tip 120 is formed by the carbon nanotube 12 attached to the front end of the probe.

The mount 122 is attached to a Z-fine movement mechanism 123 causing fine movement in the Z-direction. Further, the Z-fine movement mechanism 123 is attached to the bottom surface of a cantilever displacement detector 124.

The cantilever displacement detector 124 has a mechanism attaching a laser light source 126 and a photodetector 127 to a support frame 125 in a predetermined relationship. The cantilever displacement detector 124 and the cantilever 121 are held in a constant positional relationship, whereby the laser light 128 emitted from the laser light source 126 is reflected at the back surface of the cantilever 121 and strikes the photodetector 127. This cantilever displacement detector is comprised of an optical lever type optical detection device. This optical lever type optical detection device can detect any torsion, flexing, or other deformation at the cantilever 121.

The cantilever displacement detector 124 is attached to an XY-fine movement mechanism 129. The XY-fine movement mechanism 129 allows the cantilever 121 and probe tip 120 etc. to move by fine distances in the X- and Y-axis directions. At this time, the cantilever displacement detector 124 is moved simultaneously, so the cantilever 121 and the cantilever displacement detector 124 are unchanged in positional relation.

In the above, the Z-fine movement mechanism 123 and the XY-fine movement mechanism 129 are usually comprised by piezoelectric devices. The Z-fine movement mechanism 123 and the XY-fine movement mechanism 129 make the probe tip 120 move by fine distances (for example several to 10 μm, maximum 100 μn) in the X-axis direction, Y-axis direction, and Z-axis direction.

The above XY-fine movement mechanism 129 is attached to the above-mentioned not shown frame member to which the unit of the optical microscope 118 is attached.

Due to the mounting relationship, the field of observation of the optical microscope 118 includes a specific area of the surface of the sample 112 and the front end (back surface) of the cantilever 121 including the probe tip 120.

Next, the control system of the scanning probe microscope will be explained. The control system is comprised of a comparator 131, controller 132, first control device 133, and second control device 134. The controller 132 is for example a controller for realizing a measurement mechanism using an atomic force microscope (AFM). Further, the first control device 133 is a control device for controlling the drive operations of the plurality of drive mechanisms etc., while the second control device 134 is a higher control device.

The comparator 131 compares a voltage signal Vd output from the photodetector 127 and a preset reference voltage (Vref) and outputs a difference signal s1. The controller 132 generates a control signal s2 so that this difference signal s1 becomes 0 and gives this control signal s2 to the Z-fine movement mechanism 123. Receiving the control signal s2, the Z-fine movement mechanism 123 adjusts the cantilever 121 in height position to maintain a constant distance between the probe tip 120 and the surface of the sample 112. A control loop from the photodetector 127 to the Z-fine movement mechanism 123 is a feedback servo control loop for detecting the state of deformation of the cantilever 121 by the optical lever type optical detection device when the probe tip 120 scans the sample surface and maintaining the distance between the probe tip 120 and the sample 112 to a predetermined constant distance based on the reference voltage (Vref). Due to this control loop, the probe tip 120 is kept a constant distance from the surface of the sample 112. When scanning the surface of the sample 112 in this state, it is possible to measure relief shapes on the sample surface.

Next, the first control device 133 is a control device for driving the different parts of the scanning probe microscope and is provided with the following functional parts.

The optical microscope 118 is changed in position by the drive mechanism 117 comprised of the focus use Z-direction movement mechanism 117a and the XY-direction movement mechanism 117b. The first control device 133 is provided with a first drive controller 141 and a second drive controller 142 for controlling the operations of the Z-direction movement mechanism 117a and XY-direction movement mechanism 117b.

The image of the sample surface or cantilever 121 obtained in the optical microscope 118 is captured by the camera 119 and acquired as image data. The image data obtained by the camera 119 of the optical microscope 118 is input to the first control device 133 and processed by an internal image processor 143.

In the feedback servo control loop including the controller 132 etc., the control signal s2 output from the controller 132 means the height signal of the probe tip 120 in a scanning probe microscope (atomic force microscope). The height signal of the probe tip 120, that is, the control signal s2, can give information relating to the height position of the probe tip 120. The control signal s2 including the height position information of the probe tip 120, as explained above, is given for controlling the drive operation of the Z-fine movement mechanism 123 and is acquired by the data processor 144 in the control device 133.

The scan by the probe tip 120 of the sample surface for the measurement area of the surface of the sample 112 is performed by driving the XY-fine movement mechanism 129. The drive operation of the XY-fine movement mechanism 129 is controlled by an XY-scan controller 145 providing an XY-scan signal s3 to the XY-fine movement mechanism 129.

The drive operations of the XY-stage 114 and the Z-stage 115 of the sample stage 111 are controlled by an X-drive controller 146 outputting an X-direction drive signal, a Y-drive controller 147 outputting a Y-direction drive signal, and a Z-drive controller 148 outputting a Z-direction drive signal.

Note that the first control device 133, in accordance with need, is provided with a storage (not shown) storing and preserving the set control data, input optical microscope image data, data relating to the height position of the probe tip, etc.

The second control device 134 is provided at a position above the first control device 133. The second control device 134 stores and runs a usual measurement program, sets and stores the usual measurement conditions, stores and runs an automatic measurement program, sets and stores measurement conditions, stores measurement data, processes the measurement results, displays information on the display device (monitor) 135, and performs other processing. For setting the measurement conditions, it has functions for setting basic matters such as the measurement range and measurement speed and the angle of inclination, setting measurement conditions for when measuring the different inclinations and postures and other conditions of automatic measurement, and files for setting these conditions. Further, it is configured with a communication function and can be given a function enabling communication with an external device.

To give the second control device 134 these functions, it is comprised by a processing unit constituted by a CPU 151 and a storage 152. The storage 152 stores and preserves the program and condition data etc. Further, the second control device 134 is provided with an image display controller 153, a communicator, etc. In addition, the second control device 134 is connected through an interface 154 to an input device 136. The input device 136 enables setting and changes of the measurement program, measurement conditions, data, etc. stored in the storage 152.

The CPU 151 of the second control device 134 provides higher control instructions etc. through the bus 155 to the different functional parts of the first control device 133 and is provided with image data and data relating to the height position of the probe tip from the image processor 143, the data processor 144, etc.

Next, the basic operation of the scanning probe microscope (atomic force microscope) will be explained.

The front end of the probe tip 120 of the cantilever 121 is made to approach a predetermined area of the surface of the semiconductor substrate or other sample 112 placed on the sample stage 111. Usually, a probe tip approach mechanism constituted by the Z-stage 115 brings the probe tip 120 close to the surface of the sample 112 and applies atomic force to make the cantilever 121 flex. The amount of flexing due to the flexing of the cantilever 121 is detected by the above-mentioned optical lever type optical detection device. In this state, the probe tip 120 is made to move over the sample surface to scan the sample surface (XY-scan). The XY-scan by the probe tip 120 of the surface of the sample 112 performed by moving the probe tip 120 side by the XY-fine movement mechanism 129 (fine movement) or by moving the sample 112 side by the XY-stage 114 (rough movement) so as to create relative movement in the XY-plane between the sample 112 and the probe tip 120.

The probe tip 120 side is moved by giving an XY-scan signal s3 for XY-fine movement to the XY-fine movement mechanism 129 provided with the cantilever 121. The scan signal s3 for XY-fine movement is given from the XY-scan controller 145 in the first control device 133. On the other hand, the sample side is moved by giving drive signals from the X-drive controller 146 and Y-drive controller 147 to the XY-stage 114 of the sample stage 11.

The XY-fine movement mechanism 129 is comprised utilizing a piezoelectric device and enables high precision and high resolution scanning movement. Further, the measurement range measured by the XY-scan by the XY-fine movement mechanism 129 is restricted by the stroke of the piezoelectric device, so even at the maximum becomes a range determined by a distance of about 100 μm or so. According to the XY-scan by the XY-fine movement mechanism 129, a narrow range is measured. On the other hand, the XY stage 114 is comprised utilizing an electromagnetic motor as the drive part, so this stroke can be increased up to several hundred mm. According to the XY-scan by the XY-stage, a wide range is measured.

In the above way, a predetermined measurement area on the surface of the sample 112 is scanned by the probe tip 120 and the amount of flexing of the cantilever 121 (amount of deformation due to flexing etc.) is controlled to become constant based on a feedback servo control loop. The amount of flexing of the cantilever 121 is controlled so as to constantly match with a reference target amount of flexing (set by reference voltage Vref). As a result, the distance between the probe tip 120 and the surface of the sample 112 is held at a constant distance. Therefore, the probe tip 120, for example, moves along (scans) the surface of the sample 112 while following its profile. The height signal of the probe tip is obtained to enable measurement of the profile of the surface of the sample 112.

The configurations, shapes, sizes (thicknesses), and layouts explained in the above embodiments are only shown schematically to an extent enabling the present invention to be understood and worked. Further, the numerical values and compositions (materials) are only shown for illustration. Therefore, the present invention is not limited to the explained embodiments and can be changed in various ways within the scope of the technical idea shown in the claims.

INDUSTRIAL APPLICABILITY

The present invention utilizes a carbon nanotube or other nanotube as a probe of a scanning probe microscope etc. It eliminates the influence of the carbon contamination film by bonding the nanotube and thereby is utilized as a probe having a high bonding strength and conductivity.

DESCRIPTION OF NOTATIONS 11 holder
12 carbon nanotube
13 mounting base end
14 carbon contamination film
15 bonding coating film
16 bonding coating film
21 bonding coating film
31 bonding coating film
42 bonding coating film

The invention claimed is:

1. A method of producing a probe comprised of a nanotube, a base holding the nanotube, and a bonding means for bonding said nanotube to said base, which method comprises
performing attaching of said nanotube and said base under observation by an observing means and,
at a stage before bonding by said bonding means, stripping a contamination film formed by said observing means.

2. The method of producing a probe as set forth in claim 1, wherein said observing means is an electron microscope and said contamination film is a carbon film.

3. The method of producing a probe as set forth in claim 2, wherein said carbon film is removed by focused ion beam processing.

4. The method of producing a probe as set forth in claim 2, wherein said carbon film is removed by heating.

5. The method of producing a probe as set forth in claim 1, wherein said bonding means is a carbon film formed by electron beam irradiation.

6. The method of producing a probe as set forth in claim 1, wherein said bonding means is a film of a substance formed by introducing a reactive gas and electron beam irradiation.

7. The method of producing a probe as set forth in claim 1, wherein said bonding means is a film of a substance formed by focused ion beam irradiation.

8. A method of producing a probe comprised of a nanotube, a base holding the nanotube, and a bonding means for bonding said nanotube to said base, comprising:
a first step of bonding said nanotube, which is attached to a holder, to said base through a first coating film,
a second step of detaching said holder from said nanotube, and
a third step of bonding said nanotube to said base through a second coating film covering said first coating film.

9. The method of producing a probe as set forth in claim 8, wherein said bonding by said bonding means is performed while rotating said nanotube and said base about their axes.

10. The method of producing a probe as set forth in claim 8, wherein a bonding part formed by said bonding means is formed near the end of said base.

11. A method of producing a probe comprised of a nanotube, a base holding the nanotube, and a bonding means for bonding said nanotube to said base, wherein
the bonding by said bonding part is performed while rotating said nanotube and said base about their axes.

12. The method of producing a probe as set forth in claim 11, wherein said bonding by said bonding means is performed after reattaching said nanotube from a holder to which it is attached to said base.

13. A scanning probe microscope provided with a probe tip part provided so that a probe tip faces a sample and a measurement part for measuring a physical quantity occurring between said probe tip and said sample when said probe tip scans the surface of said sample, wherein
this measurement part holds said physical quantity constant while said probe tip scans the surface of said sample so as to measure the surface of said sample,
said probe tip is comprised of a nanotube, a base holding the nanotube, and a bonding means for bonding said nanotube to said base, and
a contamination film formed by an observing means is stripped off at a stage before bonding by said bonding means.

14. The scanning probe microscope as set forth in claim 13, wherein a probe tip part is a cantilever having said probe tip at its front end.

15. A scanning probe microscope provided with a probe tip part provided so that a probe tip faces a sample and a measurement part for measuring a physical quantity occurring between said probe tip and said sample when said probe tip scans the surface of said sample, wherein this measurement part holds said physical quantity constant while said probe tip scans the surface of said sample so as to measure the surface of said sample, said probe tip is comprised of a nanotube, a base holding the nanotube, and a bonding means for bonding said nanotube to said base, and said bonding means is a coating film provided over the entire circumferences of said nanotube and said base.

16. A probe used for a scanning probe microscope or electron microscope,
said probe having a probe tip comprised of a nanotube, a base holding the nanotube, and a bonding means bonding said nanotube to said base that is stripped of a contamination film formed by an observing means at a stage before bonding by said bonding means.

17. A probe used for a scanning probe microscope or electron microscope,
said probe having a probe tip comprised of a nanotube, a base holding this nanotube, and a bonding means bonding said nanotube to said base, said bonding means being a coating film provided over the entire circumferences of said nanotube and said base.

* * * * *